United States Patent [19]

Miyamoto

[11] Patent Number: 5,530,821
[45] Date of Patent: Jun. 25, 1996

[54] METHOD AND APPARATUS INCLUDING INDEPENDENT VIRTUAL ADDRESS TRANSLATION

[75] Inventor: Tsuyoshi Miyamoto, Yokohama, Japan

[73] Assignee: Canon Kabushiki Kaisha, Tokyo, Japan

[21] Appl. No.: 921,225

[22] Filed: Jul. 29, 1992

[30] Foreign Application Priority Data

Aug. 2, 1991 [JP] Japan .................................. 3-193936

[51] Int. Cl.$^6$ .................................................. G06F 12/10
[52] U.S. Cl. ........................ 395/413; 395/416; 395/417
[58] Field of Search ................................ 395/425, 400, 395/413, 416, 417

[56] References Cited

U.S. PATENT DOCUMENTS 3,781,808  12/1973  Ahearn et al. ..................... 340/172.5
4,802,084   1/1989  Ikegaya et al. ...................... 364/200
5,063,500  11/1991  Shorter ................................... 395/200
5,129,071   7/1992  Yamagata .............................. 395/400

OTHER PUBLICATIONS

Mano, Morris; Computer System Architecture; ©1982; pp. 428–429 & 495–501.

Primary Examiner—Jack A. Lane
Attorney, Agent, or Firm—Fitzpatrick, Cella, Harper & Scinto

[57] ABSTRACT

A method of virtual memory addressing control and information apparatus therefor for making a virtual address translation mechanism independently operate in the operating system of a virtual memory controlling architecture. In an information processing apparatus which employs the present invention, the address translating section is separated from the kernel of the operating system (OS) as an address translation server and they communicate with each other by communication messages. The address translation server calculates a physical address with reference to a process page table and system page table upon reception of a process identifier and virtual address from the OS kernel.

5 Claims, 5 Drawing Sheets

METHOD AND APPARATUS INCLUDING INDEPENDENT VIRTUAL ADDRESS TRANSLATION

BACKGROUND OF THE INVENTION

1. Field of the Invention

This invention relates to a method of memory addressing control and information processing apparatus therefor and, more particularly, to a method of virtual memory addressing control and information processing apparatus therefor.

2. Description of the Related Arts

Address translation in a conventional operating system which operates a virtual memory management is performed when address translation hardware of a CPU including an address translation cache and an operating system kernel are cooperated. However, a CPU such as a RISC chip having low integration is being adopted again when the drawback for high integration of a CPU is reconsidered. In such a CPU, address translation processing which has been conventionally performed by the internal hardware of CPU must be independently executed in the operating system.

In this conventional operating system, the architecture is such that the various processings concerning the address translation are distributed in the operating system kernel.

However, since the various processings are scattered in the operating system kernel, there are the drawbacks that the software which manages the address translation processing becomes complicated and expandability to a multi-processor system is not possible.

SUMMARY OF THE INVENTION

Accordingly, it is an object of the present invention to provide a method of virtual memory addressing control in which an address translation processing is separated from an operating system.

According to the present invention, the foregoing objects are attained by providing a method of virtual memory addressing control comprising the steps of: a first notifying step for notifying of a virtual memory address in a predetermined form of first communication message which includes a process identifier and the virtual memory address; an address translation step for translating the virtual memory address to a physical address; a second notifying step for notifying of a physical address in a predetermined form of second communication message which includes the process identifier and the physical address; and a processing step for processing information by accessing a memory medium by the notified physical address.

It is another object of the present invention to provide an information processing apparatus which employs a method of virtual memory addressing control in which an address translation processing is separated from an operating system.

According to the present invention, the foregoing objects are attained by providing an information processing apparatus which employs a virtual memory addressing control comprising memory means for storing information, first notifying means for notifying of a virtual memory address in a predetermined form of first communication message which includes a process identifier and the virtual memory address, address translation means for translating the virtual memory address notified by the first notifying means to a physical address of the memory means, second notifying means for notifying of the physical address translated by said translation means in a predetermined form of second communication message which includes the process identifier and the physical address, and processing means for processing information by accessing said memory means by the physical address which is notified by the second notifying means.

In accordance with the present invention as described above, processings for information and address translation are independently performed.

The invention is particularly advantageous since memory management can be performed only with consideration of a virtual address, without consideration of the physical address of the memory apparatus, and a more flexible memory management mechanism can be realized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 1:
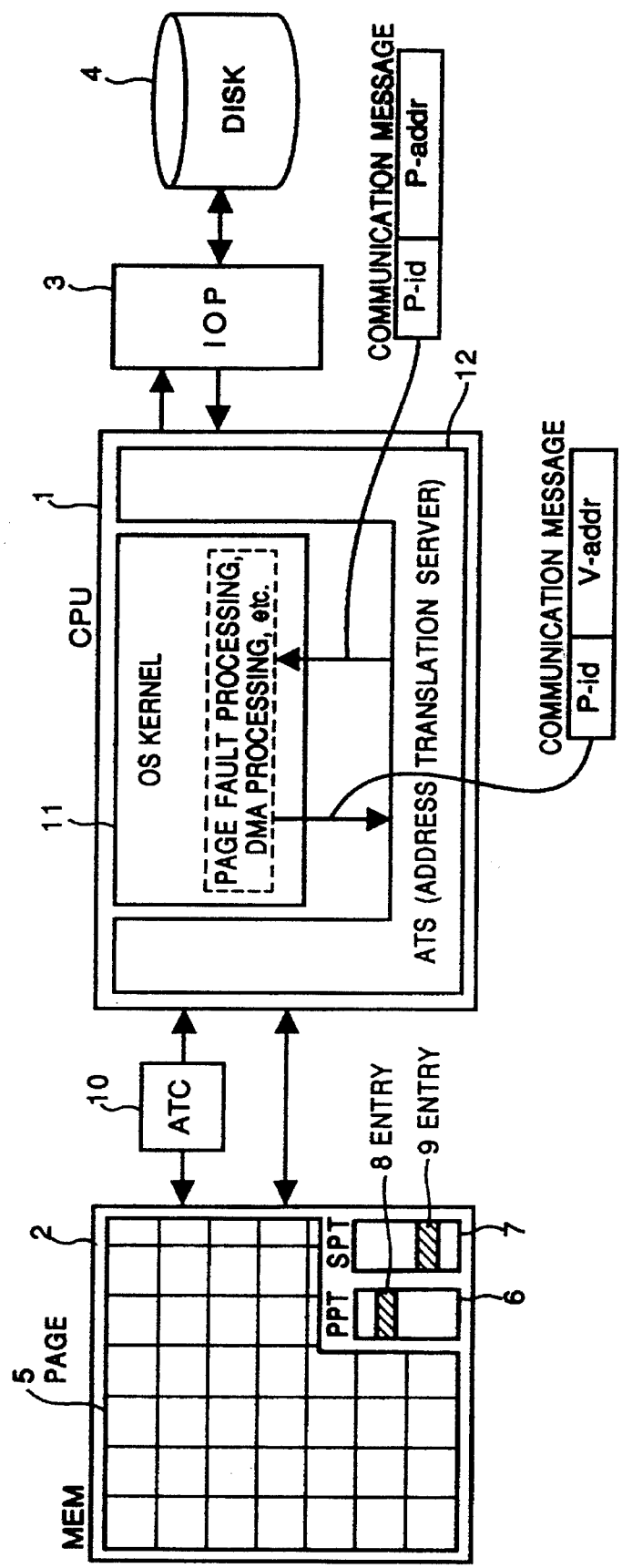
FIG. 1 is a schematic block diagram showing a configuration of an information processing apparatus which employs a virtual memory addressing architecture according to a typical embodiment of the present invention.

FIG. 1 is a schematic block diagram showing a configuration of an information processing apparatus which employs a virtual memory addressing architecture according to a typical embodiment of the present invention. In FIG. 1, an information processing apparatus comprises CPU 1, main memory (MEM) 2, input/output processor (IOP) 3, auxiliary storage unit (DISK) 4, and address translation (ATC) cache 10. The memory area of the MEM 2 is divided into small areas which are each referred to as a "page". Furthermore, the process page table (PPT) 6 for the virtual memory control and system page table (SPT) 7 are resident in the MEM 2. In other words, the information processing apparatus according to present embodiment performs virtual memory control according to a paging method.

Furthermore, the operating system (OS) kernel 11 and address translation server (ATS) 12 operate in CPU 1. The OS kernel 11 and address translation server 12 function as sub-systems which are independent from each other and exchange the below-described information by system-to-system communication.

The address translation server 12 receives a process identifier (P-id) whose process is to be executed and virtual address (V-addr) in the form of communication message from the part which needs to know the physical address from the virtual address such as the fault processing sub-system and DMA driver sub-system of the OS kernel. Based on the communication message, the address translation server 12 calculates the corresponding physical address in reference to the address information stored in the PPT 6 and SPT 7 and communicates the result in the form of communication message to the OS kernel 11.

Furthermore, the address translation server 12 can manage the cache in a manner such that the translation operation from a virtual address to physical address is applied to the ATC 10.

Figure 2:
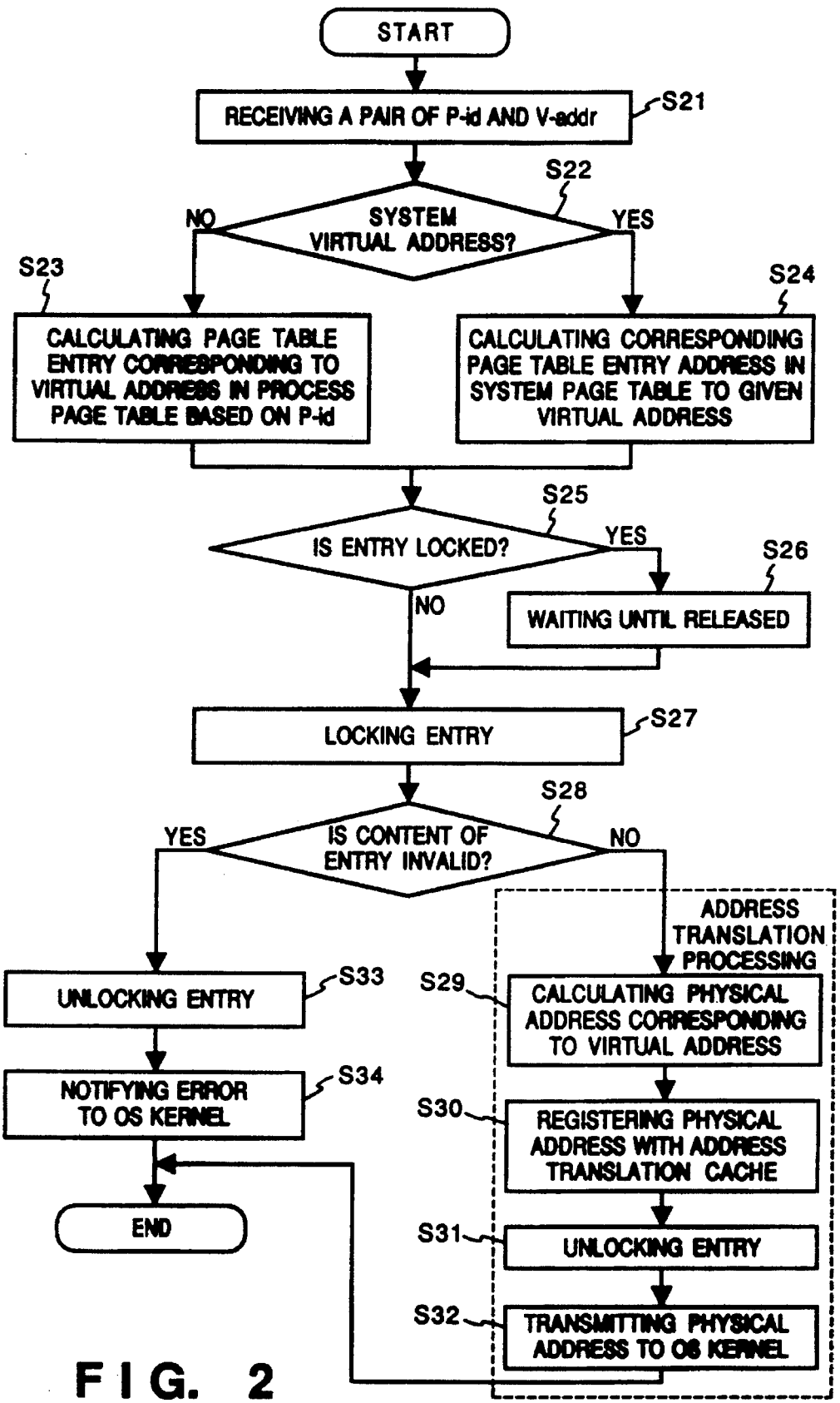
FIG. 2 is a flowchart illustrating an address translation processing of the address translation server.

In the information processing apparatus with the aforementioned arrangement, the address translation processing executed by the address translation server 12 is described along with the flowchart of FIG. 2.

In step S21, the address translation server 12 receives a pair of the P-id and V-addr from the OS kernel 11 in the form of a communication message. Then, in step S22, whether the received virtual address is a virtual address of the system or a user's virtual address is checked. If the received virtual address is for the system, the process proceeds to step S24, while if it is the user's virtual address, the process proceeds to step S23.

In step S23, an address of the page table entry 8 corresponding to the virtual address in the process page table (PPT) 6 of a designated process is calculated based on the P-id. In step S24, the P-id is ignored and the address of the corresponding page table entry 9 in the system page table (SPT) 7 which corresponds to the given system virtual address is calculated. In step S25, whether or not the entry is locked is checked based on the entry address calculated in this way. If the entry is locked, the process proceeds to step S26 and the processing comes to "on waiting" until the lock is released. After the lock is released, the process proceeds to step S27. On the other hand, if the entry is not locked, the process proceeds to step S27.

In step S27, the entry is locked. When the CPU 1 can examine the content of the entry, the process proceeds to step S28 where the content of the entry is checked. If it is determined that the content of the entry is invalid, the process proceeds to step S33 where the entry is unlocked. Then, in step S34, the occurrence of an address translation error is communicated to the OS kernel 11.

On the other hand, in the case where the content of the entry is valid, the process proceeds to step S29 where a physical address corresponding to the virtual address is calculated from the content of the entry. Furthermore, in the case where the ATC 10 is accommodated as the present embodiment, in step S30, the address translation operation of step S29 is reflected to the address translation cache of the CPU. Finally, in step S31, the entry is unlocked, and in step S32, the physical address after the address translation is communicated as a pair of the P-id and P-addr (physical address) to the OS kernel 11 in the form of the communication message as shown in FIG. 1. Thereafter, the OS kernel 11 continues the fault processing, DMA processing or the like based on the notified physical address.

Therefore, according to the present embodiment, the address translation processings in the OS kernel 11 can be centralized and all processed collectively by the address translation server 12.

Figure 3:
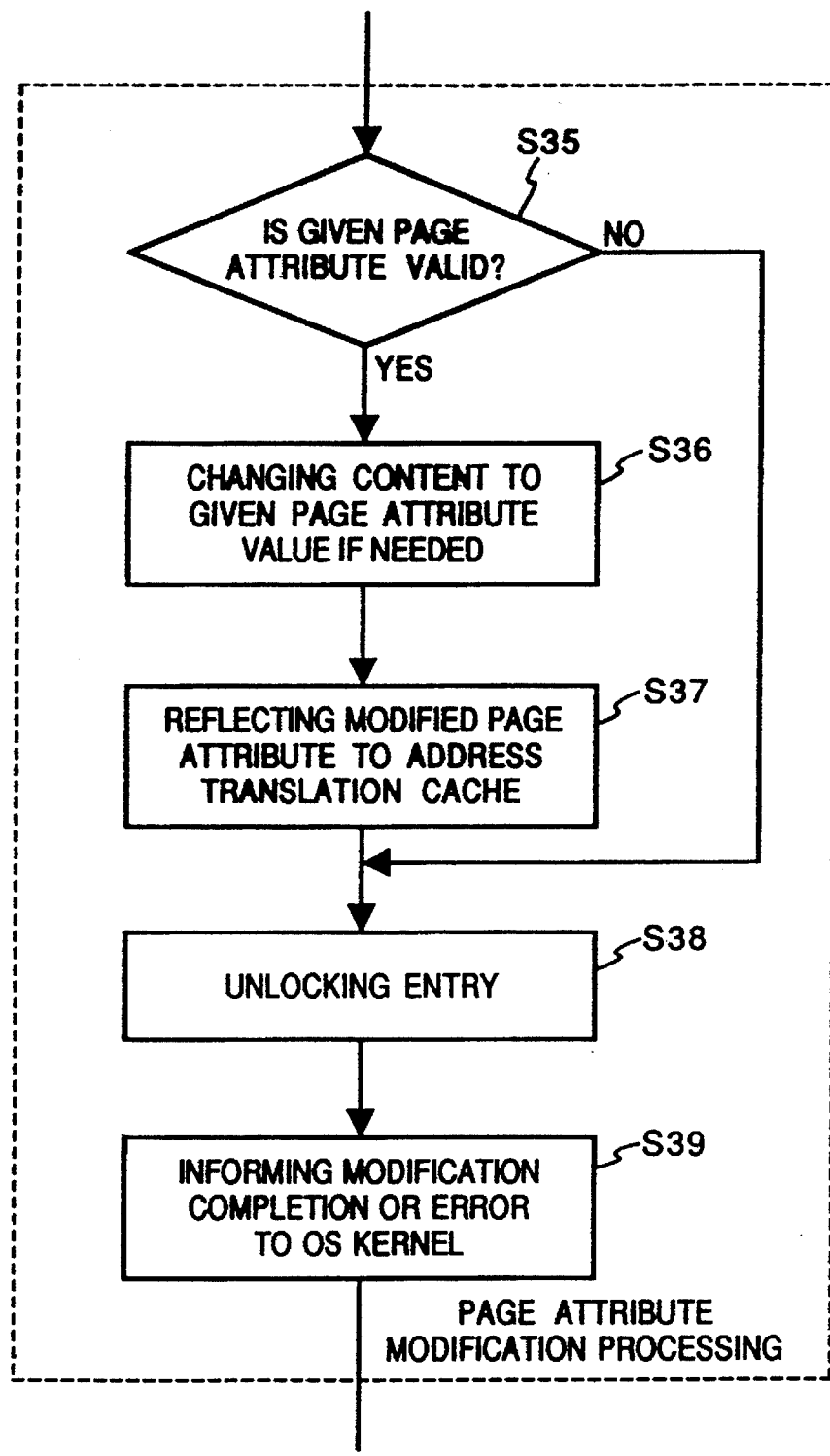
FIG. 3 is a flowchart illustrating a page attribute modification processing of the address translation server.

In the present embodiment, the case where the address translation server (ATS) executes an address translation processing has been described. However, the present invention is not limited to this case. For example, it can be set such that not only the address translation processing but also the page attribute modification can be collectively executed by the address translation server (ATS) in a manner such that the address translation processing of steps S29–S32 shown in the flowchart of FIG. 2 is replaced by the page attribute modification processing of steps S35–S39 shown in the flowchart of FIG. 3. In this case, the OS kernel 11 transmits the communication message to the address translation server 12. The value of the page attribute to be modified needs to be added to this communication message which is transmitted to the translation server 12.

In step S35, validity of the given page attribute is checked. If the given page attribute is not valid, the process proceeds to step S38, while if it is valid, the process proceeds to step S36. In step S36, the page attribute modification processing is performed and the modified page attribute is reflected to the address translation cache in step S37. In step S38, after the entry is unlocked, the message of either the page attribute modification processing error or page attribute modification completion is notified to the OS kernel 11.

Figure 4:
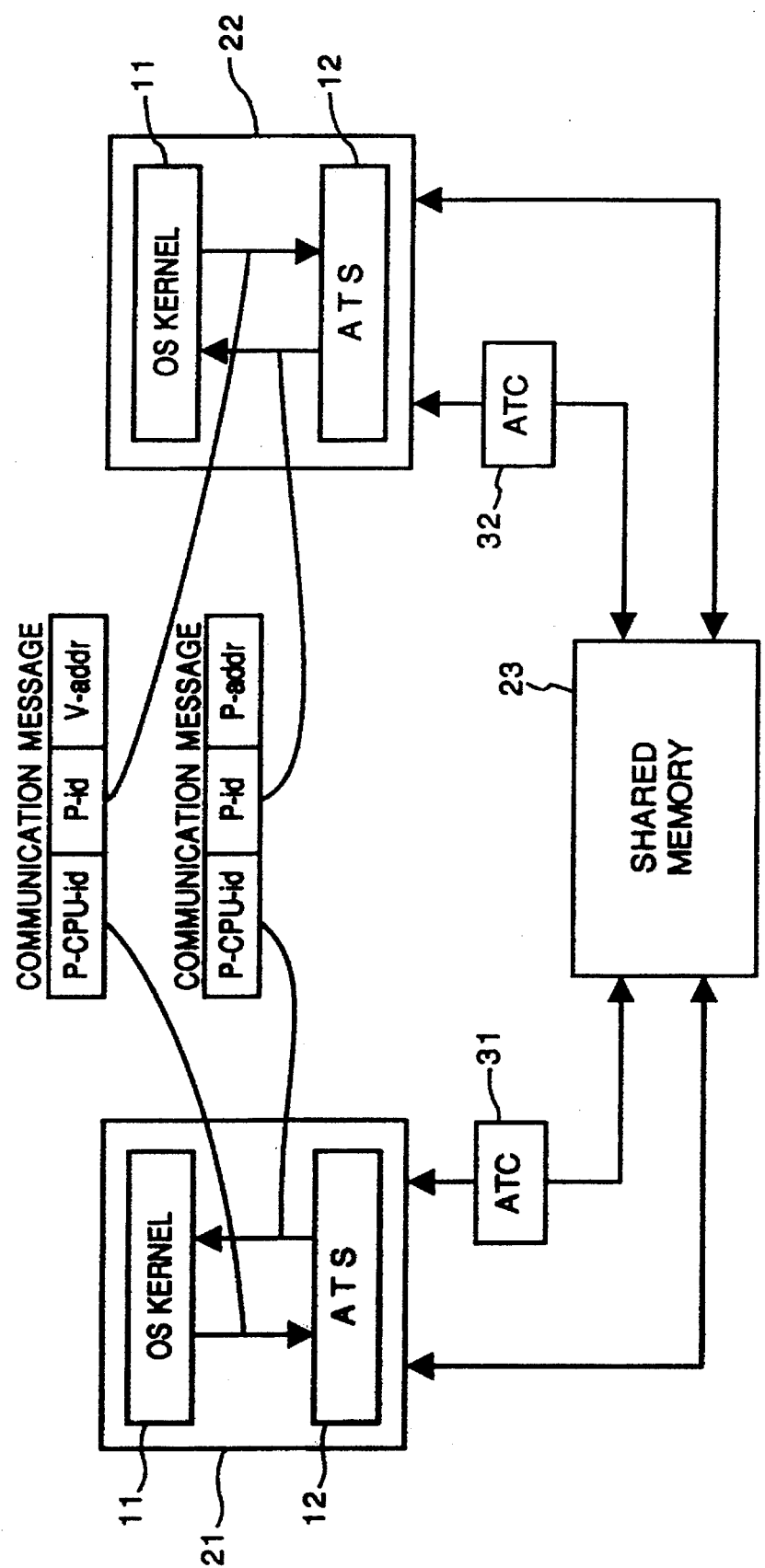
FIG. 4 is a schematic diagram showing a configuration of a shared memory multiprocessor system.

Further, the above-described architecture is applicable to a shared memory multiprocessor system as shown in FIG. 4, if a physical CPU-id is added to the communication message and a synchronization processing of the ATC is performed. The system shown in FIG. 4 has two CPU's 21 and 22, and two ATC's 31 and 32. Each of the CPU's 21 and 22 has the same structure as that shown in FIG. 1. In each CPU, a communication message is exchanged in the form shown in FIG. 4 between the OS kernel 11 and the ATS 12. In the communication message, a P-CPU-id denotes a physical CPU identifier.

Figure 5:
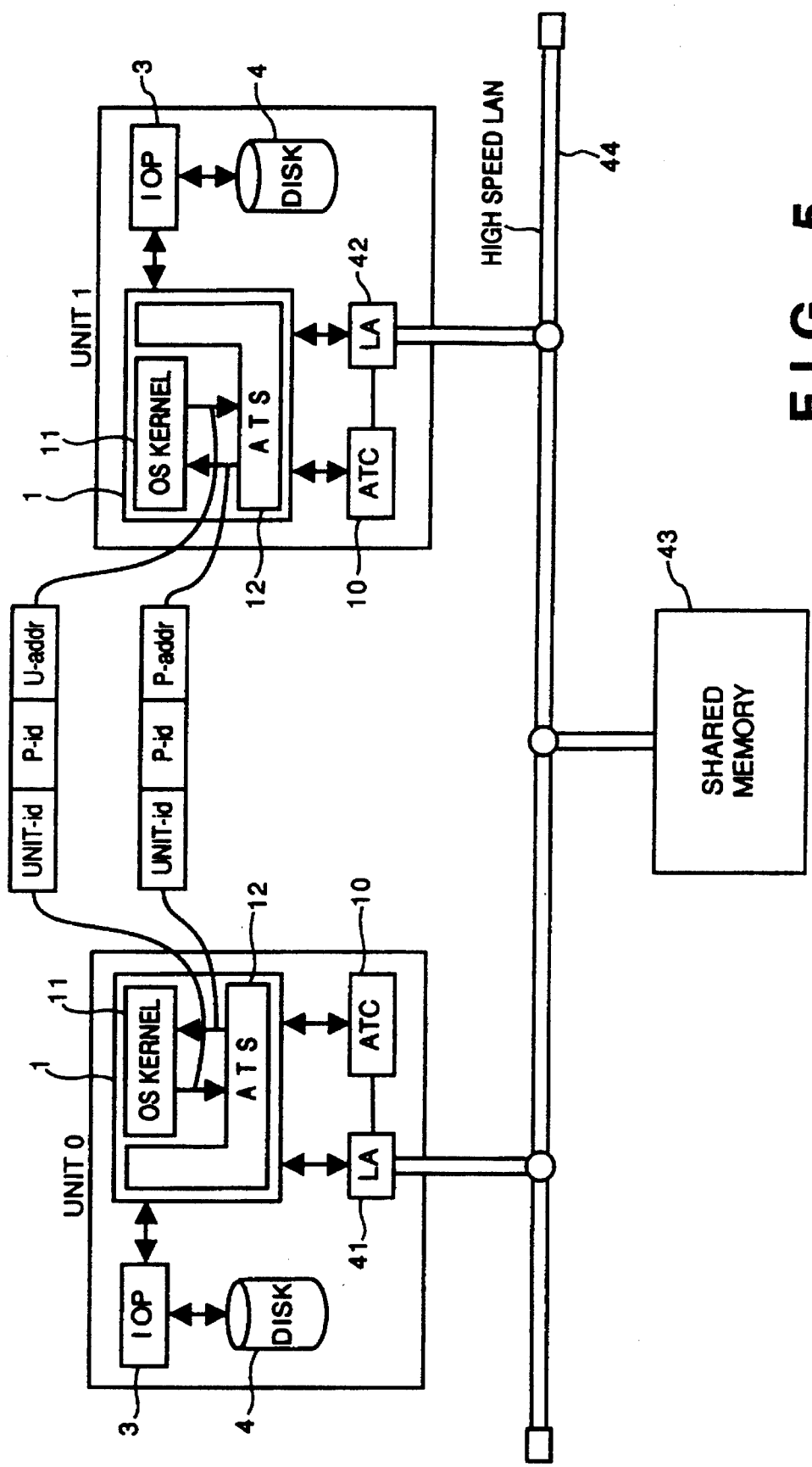
FIG. 5 is a schematic diagram showing a configuration of a distributed shared memory system.

Furthermore, it is possible to provide a distributed shared memory system in a distributed system as shown in FIG. 5 which is coupled by a network, if a unit-id is added to the communication message. The system shown in FIG. 5 comprises two information processing apparatuses, which are referred to as Unit 0 and Unit 1, shared memory 43 and a high speed LAN path 44.

Numeral 41 and 42 denote LAN adaptors (LA's) which are respectively connected to the high speed LAN path 44. Each of the Units 0 and 1 can access the shared memory 43 through the LA's 41 and 42. When each of units 0 and 1 accesses the shared memory 43, a communication message is exchanged in the form shown in FIG. 5 between the OS kernel 11 and the ATS 12 in each unit. In the communication message, a unit-id denotes a unit-identifier.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A method of virtual memory addressing control in a system having a processing unit and a memory, said method comprising the steps of:

a first transmission step for transmitting a first communication message which includes a process identifier and a virtual memory address from a client program to a server program, wherein each of the programs operates in the processing unit;

an address translation step for translating the virtual memory address, included in the first communication message transmitted from the client program to the server program, to a physical memory address of the memory based on the process identifier included in the first communication message by the server program;

a second transmission step for transmitting a second communication message which includes the process identifier and the translated physical memory address from the server program to the client program; and a processing step for processing information by the client program by accessing to the memory with the translated physical memory address included in the second communication message transmitted from the server program to the client program.

2. The method according to claim 1, wherein said address translation step further comprises the steps of:

a reception step for receiving the virtual memory address included in the first communication message transmitted in said first transmission step; and a calculation step for calculating the physical memory address of the memory based on the virtual memory address received in said reception step.

3. The method according to claim 2, wherein said calculation step further comprises the steps of:

a referencing step for referencing a correspondence table which indicates a relation of the virtual memory address and physical memory address;

a checking step for checking the content of the correspondence table;

an address translation error notification step for notifying the client program that the address translation is an error based on the result of check in said checking step; and a conversion step for converting the virtual memory address to the physical address based on the correspondence table according to the result of check in said checking step.

4. The method according to claim 3, wherein said referencing step further comprises the steps of:

a determination step for determining whether or not an entry of the correspondence table for the virtual memory address is locked; and a locking step for locking the entry if the entry is determined not to be locked.

5. The method according to claim 4, wherein said referencing step further comprises the step of:

a waiting step, in which, if the entry is determined to be locked, processing waits until the lock is released.

* * * * *